(12) United States Patent
Saint-Jalmes et al.

(10) Patent No.: US 8,313,058 B2
(45) Date of Patent: Nov. 20, 2012

(54) MODULAR FURNITURE FOR AN AIRCRAFT

(75) Inventors: Bruno Saint-Jalmes, Toulouse (FR);
Jason Zaneboni, Blagnac (FR);
Bernard Rumeau, Cornebarrieu (FR)

(73) Assignee: Airbus, Blagnac (FR)

( * ) Notice: Subject to any disclaimer, the term of this patent is extended or adjusted under 35 U.S.C. 154(b) by 216 days.

(21) Appl. No.: 12/704,154

(22) Filed: Feb. 11, 2010

(65) Prior Publication Data
US 2010/0243801 A1   Sep. 30, 2010

(30) Foreign Application Priority Data

Feb. 11, 2009   (FR) ...................................... 09 00598

(51) Int. Cl.
*B64D 13/00*   (2006.01)
(52) U.S. Cl. ................................... 244/118.5
(58) Field of Classification Search ............... 244/118.5, 244/129.4; 312/249.5, 249.6, 249.12, 249.13; 108/59, 60, 61, 77–87; D19/34.1, 34.2, 90, D19/92
See application file for complete search history.

(56) References Cited

U.S. PATENT DOCUMENTS

| | | | |
|---|---|---|---|
| 5,224,531 A * | 7/1993 | Blohm .......................... | 144/285 |
| 7,152,536 B2 * | 12/2006 | Hardy ............................. | 108/61 |
| 2006/0054741 A1 | 3/2006 | Mills et al. | |
| 2006/0260518 A1 * | 11/2006 | Josefsson et al. ............... | 108/61 |
| 2008/0001031 A1 * | 1/2008 | Doebertin et al. ......... | 244/118.1 |
| 2009/0200902 A1 * | 8/2009 | McKay et al. ............ | 312/249.12 |
| 2012/0085862 A1 * | 4/2012 | Pangalila ................... | 244/118.5 |

FOREIGN PATENT DOCUMENTS

DE   10 2006 023 047 A1   11/2007
EP   1 118 537 A2   7/2001

* cited by examiner

*Primary Examiner* — Tien Dinh
*Assistant Examiner* — Jamie S Stehle
(74) *Attorney, Agent, or Firm* — Oblon, Spivak, McClelland, Maier & Neustadt, L.L.P.

(57) ABSTRACT

A storage unit for aircraft trolleys includes a housing accommodating at least one aircraft trolley and including a horizontal tray arranged on top of the housing. The storage unit includes a movable partition extending in a plane perpendicular to the tray and above the tray so that at least a part of the movable partition extends up to a ceiling of an aircraft. The partition is movable in translation from one edge of the tray to an opposite edge.

16 Claims, 13 Drawing Sheets

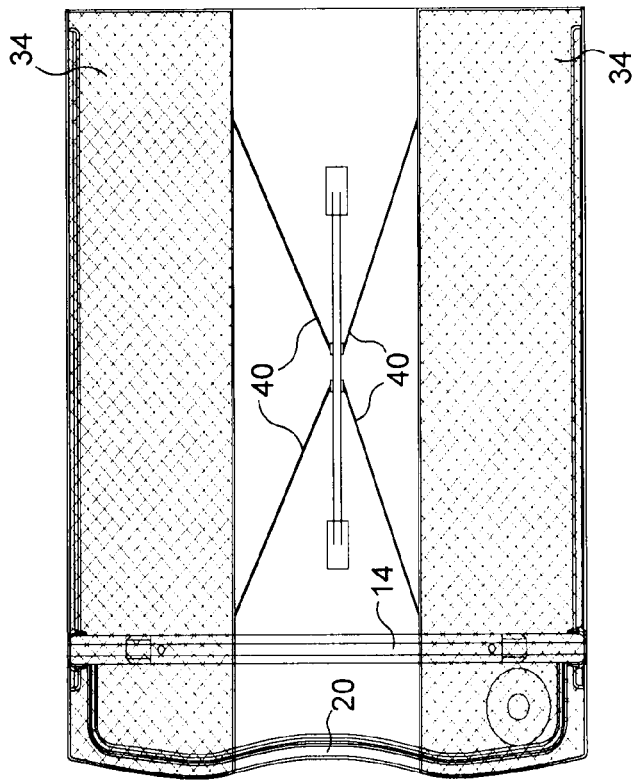
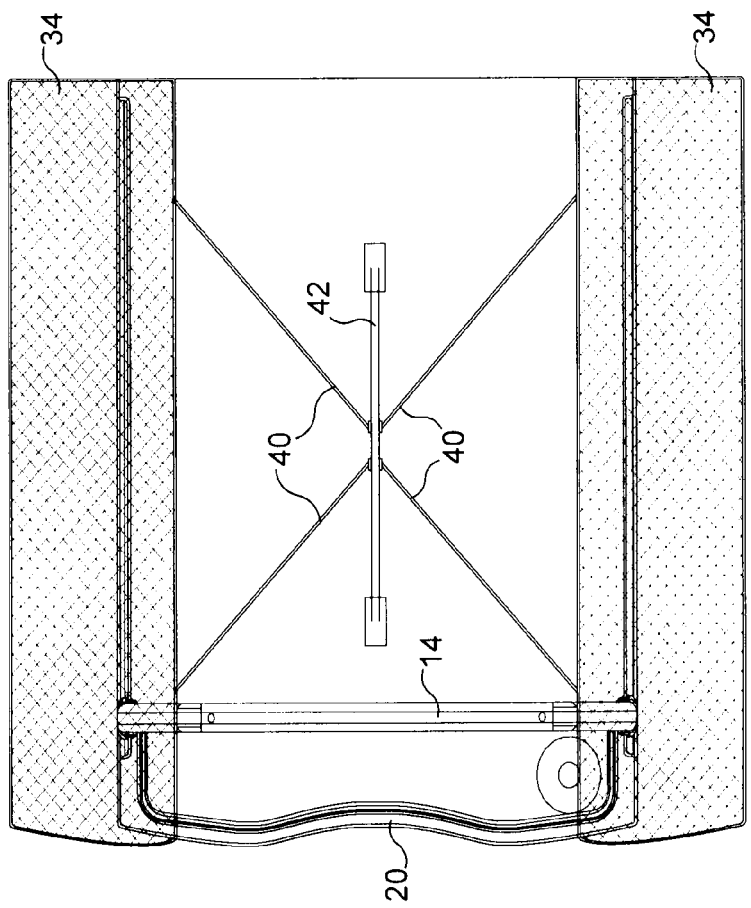

MODULAR FURNITURE FOR AN AIRCRAFT

BACKGROUND OF THE INVENTION

1. Field of the Invention

This invention relates to an adjustable unit intended in particular for an aircraft and more particularly for the layout of the rear portion of an aircraft.

2. Description of Related Art

Aircraft intended for the transport of passengers, in particular those intended for long-haul flights, comprise a cabin accommodating the passengers. For the comfort of the passengers, kitchens, also called galleys, are provided in the cabin for storing and/or preparing meals and the serving of these meals is performed by the commercial flight personnel with the aid of carts, also called trolleys. The galleys and storage spaces for the trolleys are provided at various locations distributed in the cabin of the aircraft. In general, the rear of the cabin of such an aircraft, that is to say the space behind the last door of the aircraft, is laid out to accommodate trolleys and has a work space provided for preparing the meals intended to be carried by the trolleys.

The document U.S. Pat. No. 7,198,228 shows an aircraft rear-portion layout in which a fairly deep housing for accommodating at least two trolleys one behind the other is provided. This housing, in the embodiments shown, occupies more or less the entire available surface behind the last door of the aircraft. It also may be laid out in a rest space for accommodating the flight personnel.

SUMMARY OF THE INVENTION

This document shows an aircraft rear-space layout provided for accommodating trolleys and/or preparing meals. In comparison with these documents of the prior art, this invention has as a purpose to provide means making it possible to adjust an aircraft rear space the layout of which is planned, for example, for accommodating trolleys and galleys, in particular refrigerated galleys, as well as possibly a work space.

This invention has been implemented in the context of a layout of a rear portion of an aircraft, but the means provided by this invention may be used in an aircraft outside the rear portion thereof.

One purpose of this invention is to provide at once a convivial space for the passengers during long-haul flights and a work space for the flight personnel who prepare meals and beverages for the passengers.

The invention also has as a purpose to make it possible to adjust a space in an aircraft according to flight phases and/or service requirements on board the aircraft.

To this end, this invention proposes a storage unit for aircraft trolleys comprising a housing for accommodating at least one trolley as well as a more or less horizontal tray arranged on top of the housing.

According to this invention, this unit comprises a movable partition extending in a plane more or less perpendicular to the tray and above the latter, and this partition is movable in translation from one edge of the tray to an opposite edge.

Such a unit makes it possible to achieve a separation between a kitchen (galley) in an aircraft and a space for the passengers. The movable partition makes it possible to achieve this separation. The fact that it is movable makes it possible to increase the available space on one side of the partition in comparison with the space found on the other side of the partition.

An embodiment variant adapted to the shape of the trolleys intended to be positioned in the unit provides that the tray is more or less rectangular, having two longitudinal edges and two transverse edges, and that the movable partition extends parallel to the transverse edges and from one longitudinal edge to the opposite longitudinal edge. Here, in order to allow guidance of the movable partition in its translational movement, the longitudinal edges are provided with guide means cooperating with complementary guide means with which the movable partition is equipped. In such a case, it may be provided that each longitudinal edge of the tray comprises a groove implemented in the thickness of the tray, and that the movable partition comprises a guide finger corresponding to each of the two grooves and able to slide in the corresponding groove. In order to implement stops, each groove advantageously stops before the end of the longitudinal edge of the corresponding tray.

In order to ensure guidance for the movable partition, the latter has, for example, guide means on an edge opposite the tray. One embodiment then provides that the movable partition has, on an edge opposite the tray, at least two guide pins intended to slide in a groove implemented in a ceiling. In this scenario, the movable partition extends up to the ceiling of the cabin of the aircraft. It may be contemplated, however, to have a partition that does not extend up to the ceiling and which allows a space to remain between the partition and the ceiling, for example for a better ventilation of the galley at the rear of the aircraft.

In order to maintain the movable partition in a given position, it advantageously comprises locking means making it possible to maintain it in a given position in relation to the tray.

In order to increase the surface available for setting down objects, the unit preferably also comprises at least one shelf arranged underneath the tray parallel thereto and movable between a fully retracted position underneath the tray and an opened-out position in which it juts out over the tray, forming a projection. Such a shelf moves, for example, in translation along a direction parallel to the tray and perpendicular to the direction of movement of the movable partition.

A preferred embodiment provides that the unit comprises two shelves arranged underneath the tray parallel thereto and movable between a fully retracted position underneath the tray and an opened-out position in which they jut out over the unit, forming a projection, and that the two shelves extend from two opposite edges of the tray in their opened-out positions.

In this preferred embodiment, it also may be provided that the passage from the retracted position to the opened-out position controls the passage from the retracted position to the opened-out position of the other shelf, and vice versa.

This invention also relates to an aircraft, characterized in that it comprises a unit such as described above. Such a unit is, for example, arranged in a rear portion of the aircraft, behind a last door of the aircraft, and in that the unit is more or less centered in relation to the width of the aircraft.

BRIEF DESCRIPTION OF THE DRAWINGS

Details and advantages of this invention will become more apparent from the description that follows, presented with reference to the attached schematic drawings on which:

FIGS. 14 and 15 are views corresponding to the views of FIGS. 12 and 13 showing an embodiment variant of a control mechanism for the shelves.

DETAILED DESCRIPTION OF THE INVENTION

Figure 1:
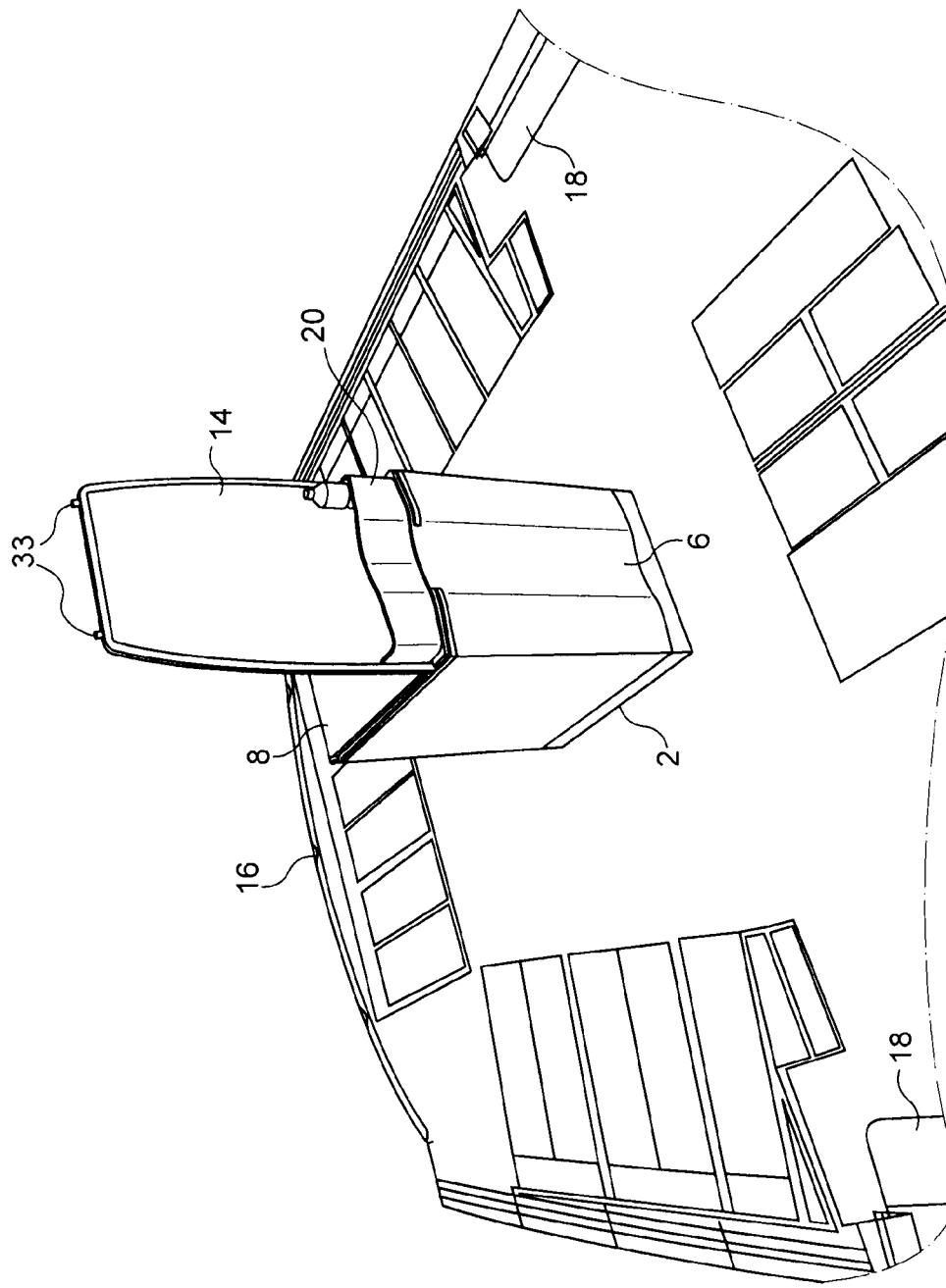
FIG. 1 is a perspective view of a unit according to the first invention in a first configuration.

FIGS. 1 to 8 show a unit intended to accommodate two carts (not illustrated) which sometimes also are called "trolleys." This unit comprises two side walls 2 and 4, a front wall 6 and a tray 8. In the embodiment shown on the drawings, each of the walls and the tray 8 are of rectangular shape. In this way they form a more or less parallelepipedal housing 10 that makes it possible to accommodate two trolleys. The rear face of the unit, opposite the front wall 6, has an opening 12 that allows trolleys to be introduced into and removed from the housing 10. It is assumed, for example, that the trolleys used here are of standardized shape and size. They then are parallelepipedal in shape and are equipped with casters. In a view from above, they have an oblong shape and are introduced into the housing 10 parallel to the side walls 2 and 4. It will be assumed hereinafter that these side walls 2 and 4 extend in a vertical plane along a longitudinal direction, while the front wall extends in a transverse vertical plane. As for the tray 8, it then is in a horizontal plane.

In original manner, the tray 8 is topped by a movable partition 14 that extends vertically and is movable in translation along a direction referred to as longitudinal that is on the one hand horizontal, that is to say parallel to the tray 8 and on the other hand parallel to the longitudinal side walls 2 and 4. In the preferred embodiment shown on the drawings, this movable partition 14 extends at its base, that is to say on the side of the tray 8, more or less over the entire width of the latter and rises from the tray 8 up to a ceiling, not shown. This movable partition 14 is a separating wall, for example, of more or less rectangular or trapezoidal shape. It is implemented, for example, by cutting out a block in a composite panel, comprising a core sandwiched between two finishing layers. As a variant, this movable partition 14 may extend toward the ceiling without, however, reaching it, leaving a space between the ceiling and the movable partition 14. This space may be used, for example, for a better ventilation on both sides of the movable partition 14.

Figure 3:
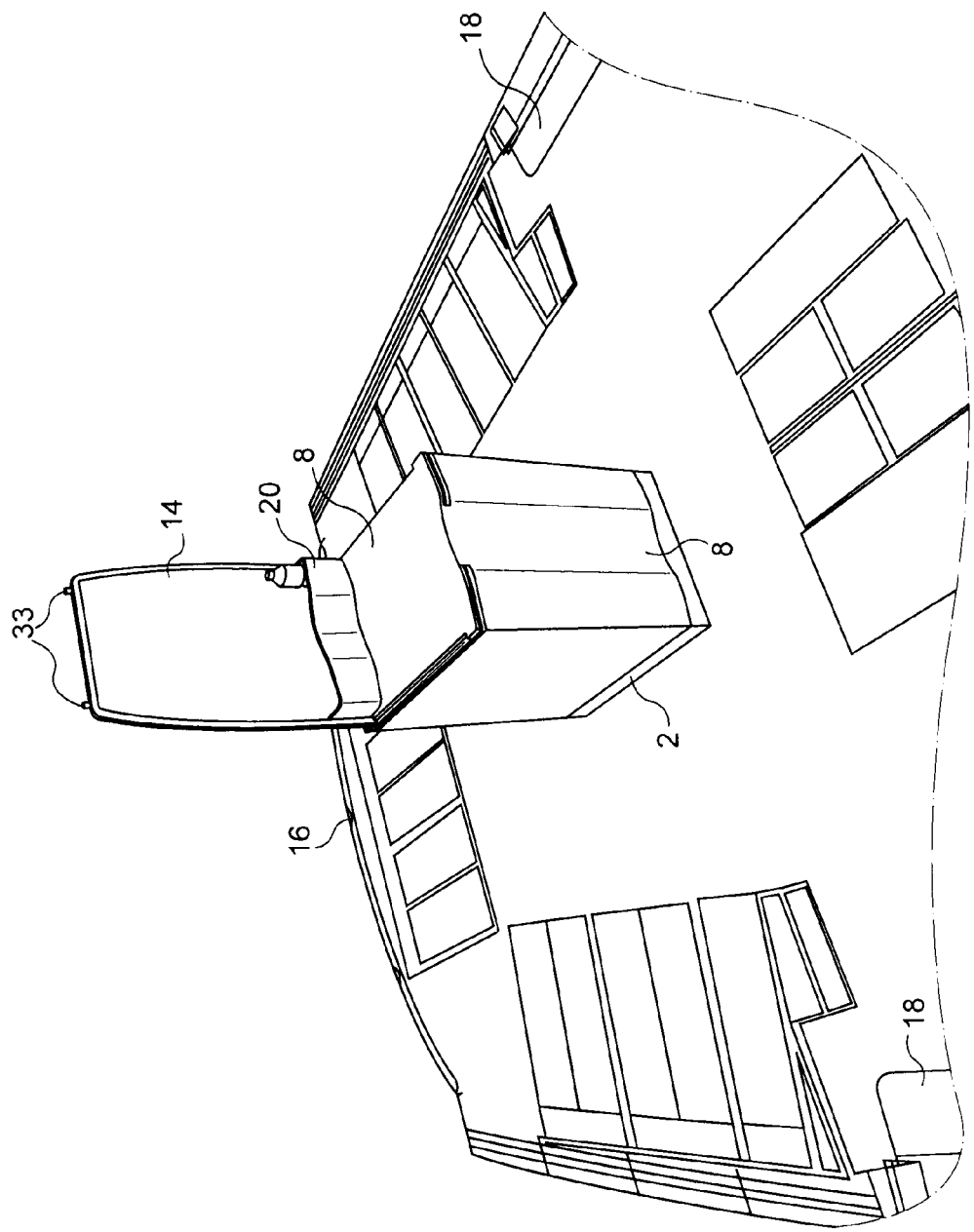
FIG. 3 shows the unit of FIG. 1 according to the same perspective in a third configuration.
Figure 5:
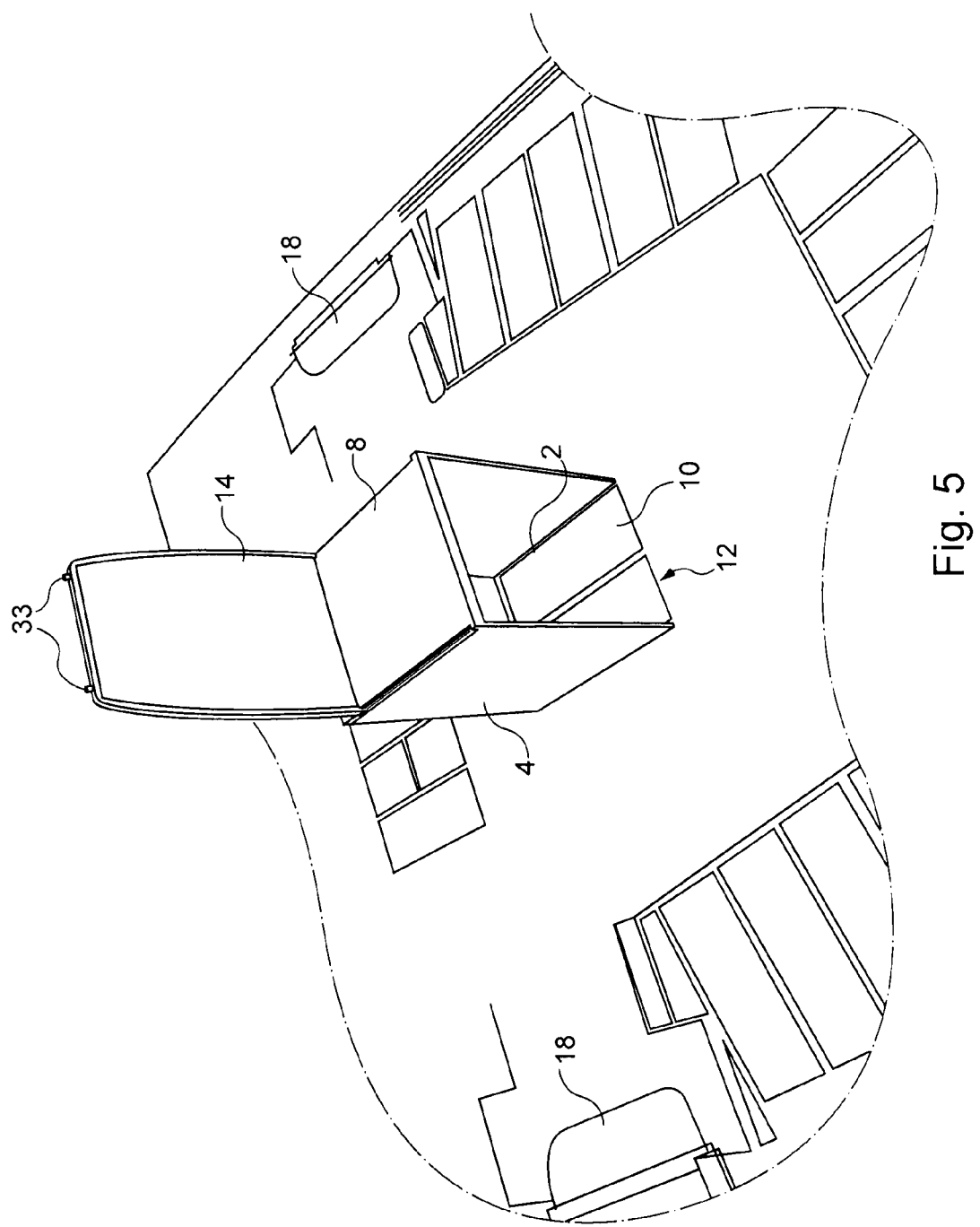
FIGS. 5 to 8 show in perspective the same unit according to the invention but according to a different angle of view in configurations corresponding to the configurations of FIGS. 1 to 4, respectively.
Figure 7:
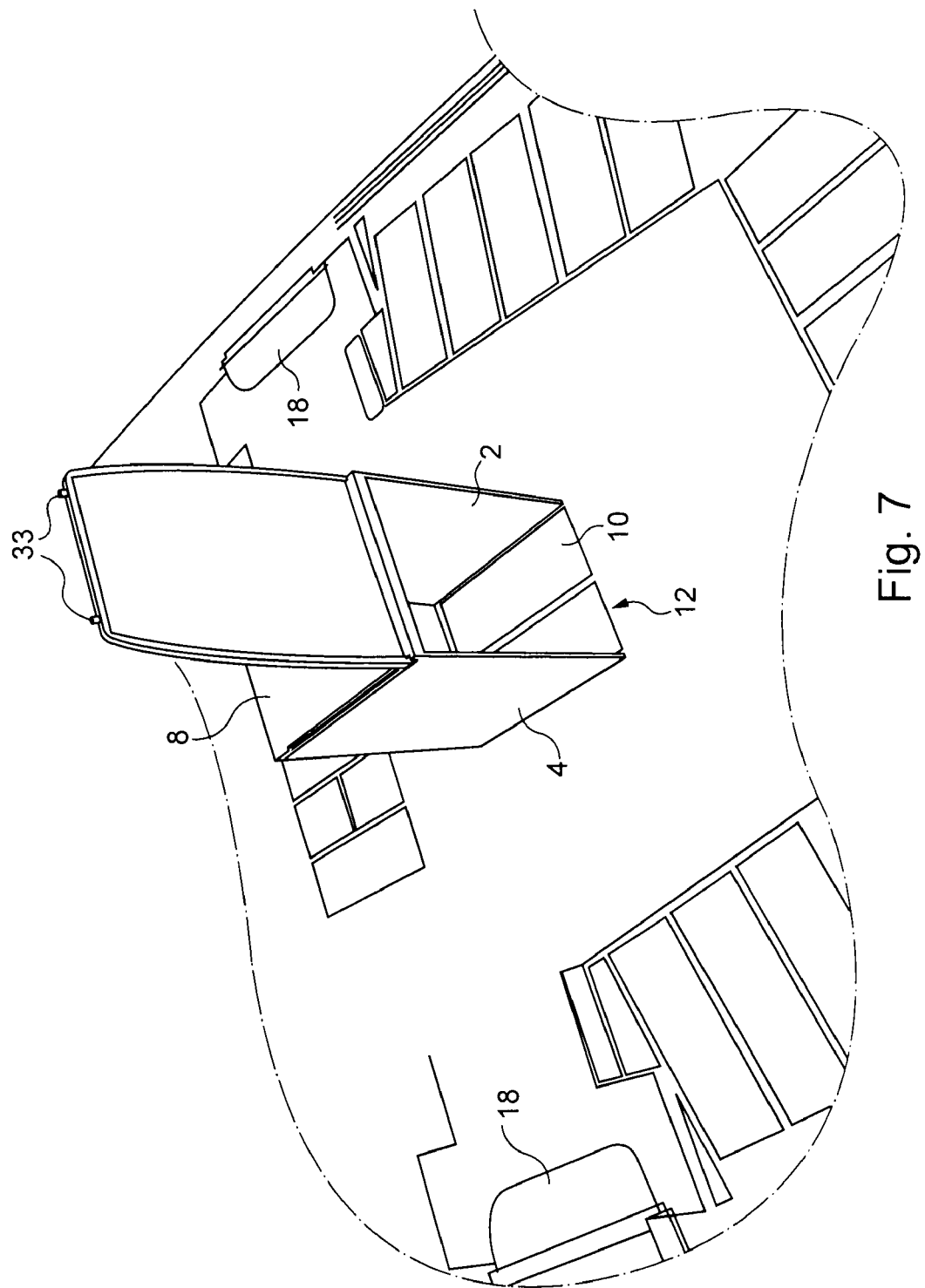

FIGS. 1 and 3, the same as FIGS. 5 and 7, show the two extreme positions of the movable partition 14. The latter may move sweeping over more or less the entire surface of the tray 8.

In the application shown in the drawings, the unit described here is located in the rear portion of an aircraft intended for the transport of passengers. It concerns, for example, an aircraft of the type of those commonly used by the airline companies for the transport of passengers over long distances. Such an aircraft generally allows transport of at least one hundred passengers. It is assumed here that it concerns an aircraft of single-deck type, comprising a main deck on which there is laid out at the front of the aircraft a cockpit (not shown) in which the pilots are seated for flying the aircraft. A passenger cabin (not shown) is laid out behind the cockpit as far as the rear of the aircraft. The drawings show the portion of the passenger cabin located at the end of the main deck facing the cockpit. In standard manner, a hold (not shown) is provided underneath the main deck.

The longitudinal direction defined above is in fact defined in relation to the longitudinal axis of the aircraft. Likewise, the front wall 6 is so designated because in relation to the unit and to the direction of movement of the aircraft, it is located at the front. The wall of the aircraft cabin comprises side walls that correspond to the fuselage of the aircraft and, on the side facing the cockpit, the wall of the cabin is formed by a partition extending more or less crosswise in relation to the longitudinal axis of the aircraft and referred to as impervious partition 16. The latter separates the cabin from a non-pressurized technical compartment arranged in the rear end of the fuselage, also referred to as rear cone of the aircraft.

The cabin wall comprises several doors allowing access to and evacuation from the passenger cabin. These doors are distributed along the cabin. There generally is designated by the term "door" a set of two doors facing each other and arranged on both sides of the cabin, symmetrically in relation to the longitudinal axis of the aircraft. On the Figures there thus has been shown the last door 18 of the aircraft, that is to say the door (i.e. the pair of doors) located the farthest back in relation to the longitudinal axis of the aircraft, or else, expressed differently, the farthest away from the cockpit.

The unit described here is used for the layout of the cabin of the aircraft behind the last door 18. This space is a work and storage space for the commercial flight personnel. Indeed, during travel in an aircraft, in particular during long-haul flights, beverages and meals are offered to the passengers. It is appropriate, therefore, to provide areas for storing the beverages and the foodstuffs and for preparing them before serving them. These storage and preparation spaces generally are referred to by the English term "galley," translated as kitchen. The meals prepared in the galley then are arranged with beverages on trolleys for service to the passengers. These trolleys are stored in housings, such as housing 10, when they are not being used. The depth of each of the housings, just like housing 10, corresponds more or less to the length of a trolley. The positions of the other housings for trolleys are shown on FIGS. 1 to 8 in fine lines.

The unit according to the invention here is placed, in relation to the width of the aircraft, in a central position. In this way it forms an island because it is surrounded on all sides by aisles or passageways and therefore can be referred to as a central island. It also is located at the boundary of the zone occupied by the passengers (cabin of the aircraft) and a zone reserved for the commercial flight personnel. This unit contributes, in particular by virtue of the presence of the movable partition 14, to the separation of these two zones of the cabin of the aircraft.

On the passenger side, the unit according to the invention may be used as a bar, for example. As in the exemplary embodiment shown on the drawings, the movable partition 14 may be equipped with a wine rack 20. Other equipment items may be contemplated on the front face of the movable partition 14. For example, equipment items complementary to the wine rack 20 may be involved. There may be provided, for example, a rack for glasses, a shelf for holding crackers, another wine rack, etc. Other equipment items such as, for example, a newspaper rack, a screen for information items on the flight in progress, a television screen. etc., may be involved.

In the configuration shown on FIGS. 1 and 5, the movable partition 14 is in its brought-forward position. This makes it possible to clear, on the tray 8, behind the movable partition 14, a work surface for the commercial flight personnel. This position of the movable partition 14 corresponds, for example, to the phases where this work surface is necessary for the preparation of meals, for example.

Once the service has ended, the movable partition 14 may assume the moved-back position illustrated on FIGS. 3 and 7. Here, the tray 8 is accessible to the passengers and can be used as a bar table. In the case where the unit according to the invention is used as a bar, the passengers can set their glasses down on the tray 8 and help themselves or merely converse among themselves.

Figure 2:
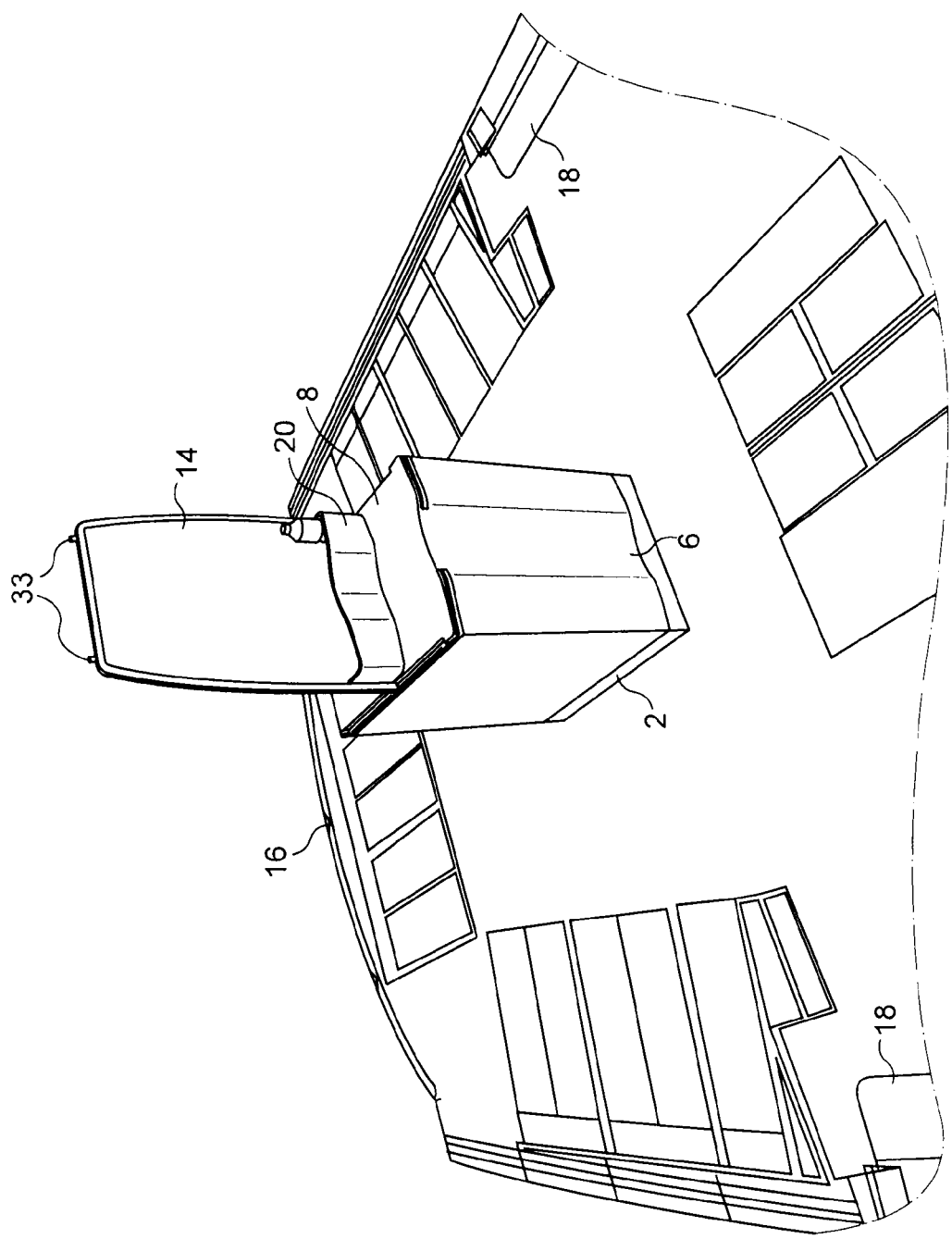
FIG. 2 shows the unit of FIG. 1 according to the same perspective in a second configuration.
Figure 6:
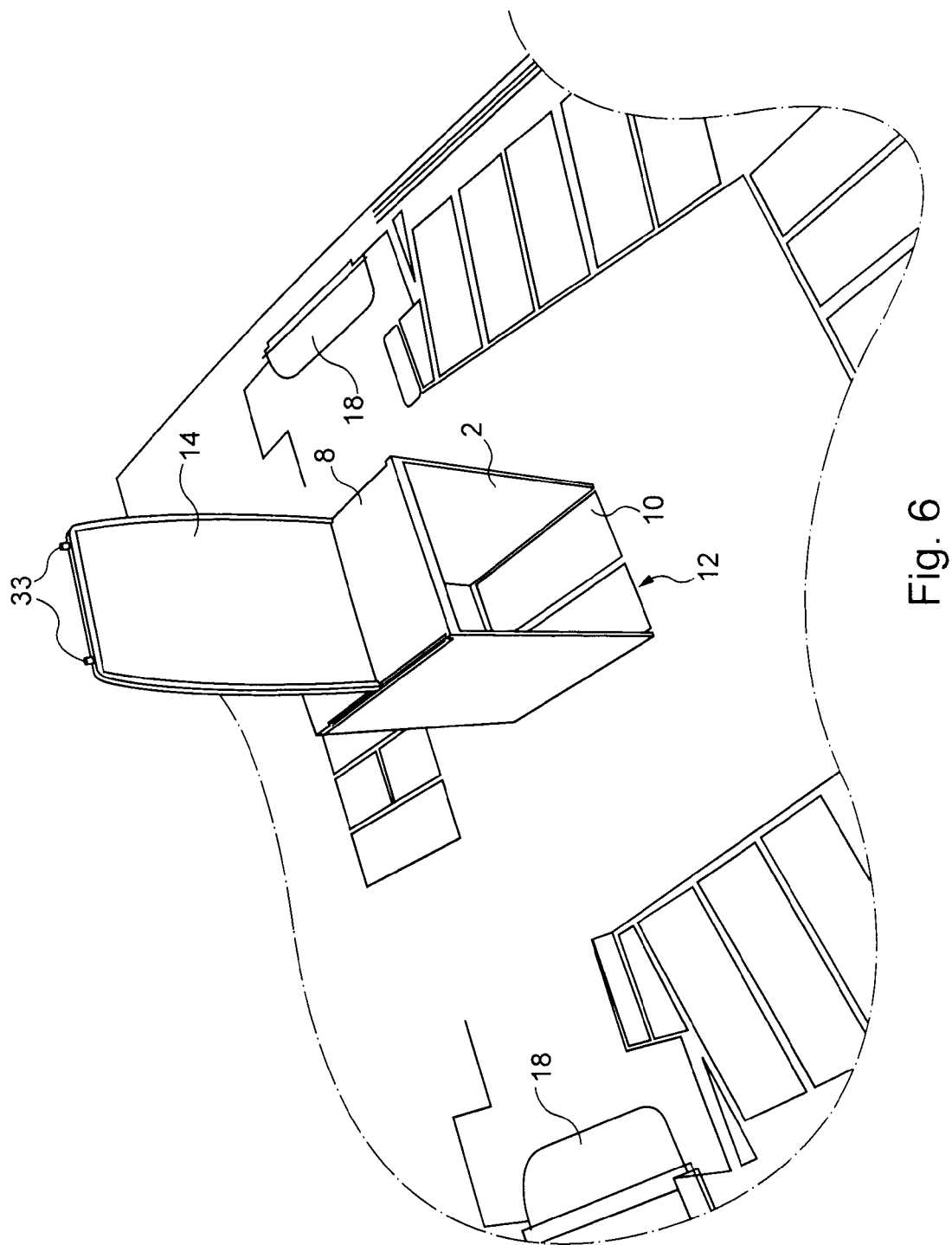

The configurations shown on FIGS. 2 and 6 may be simple configurations intermediate between the extreme positions of FIGS. 1 and 3 (or 5 and 7) or alternative configurations making it possible on the one hand to gain on one side of the movable partition 14, a work surface used, for example, for the preparation of the service to the passengers and on the other hand to have on the other side of the movable partition 14, a bar table or a magazine table (or . . . ).

Figure 9:
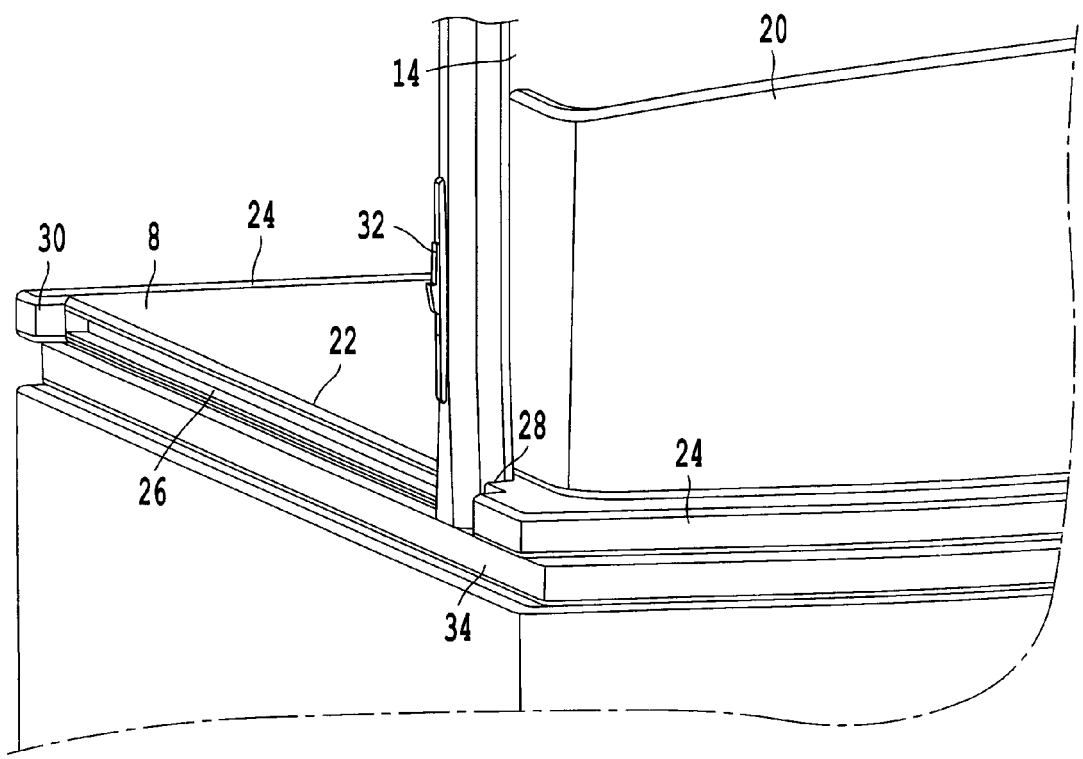
FIG. 9 shows a detail of the unit of FIGS. 1 to 8, in perspective and on an enlarged scale.
Figure 10:
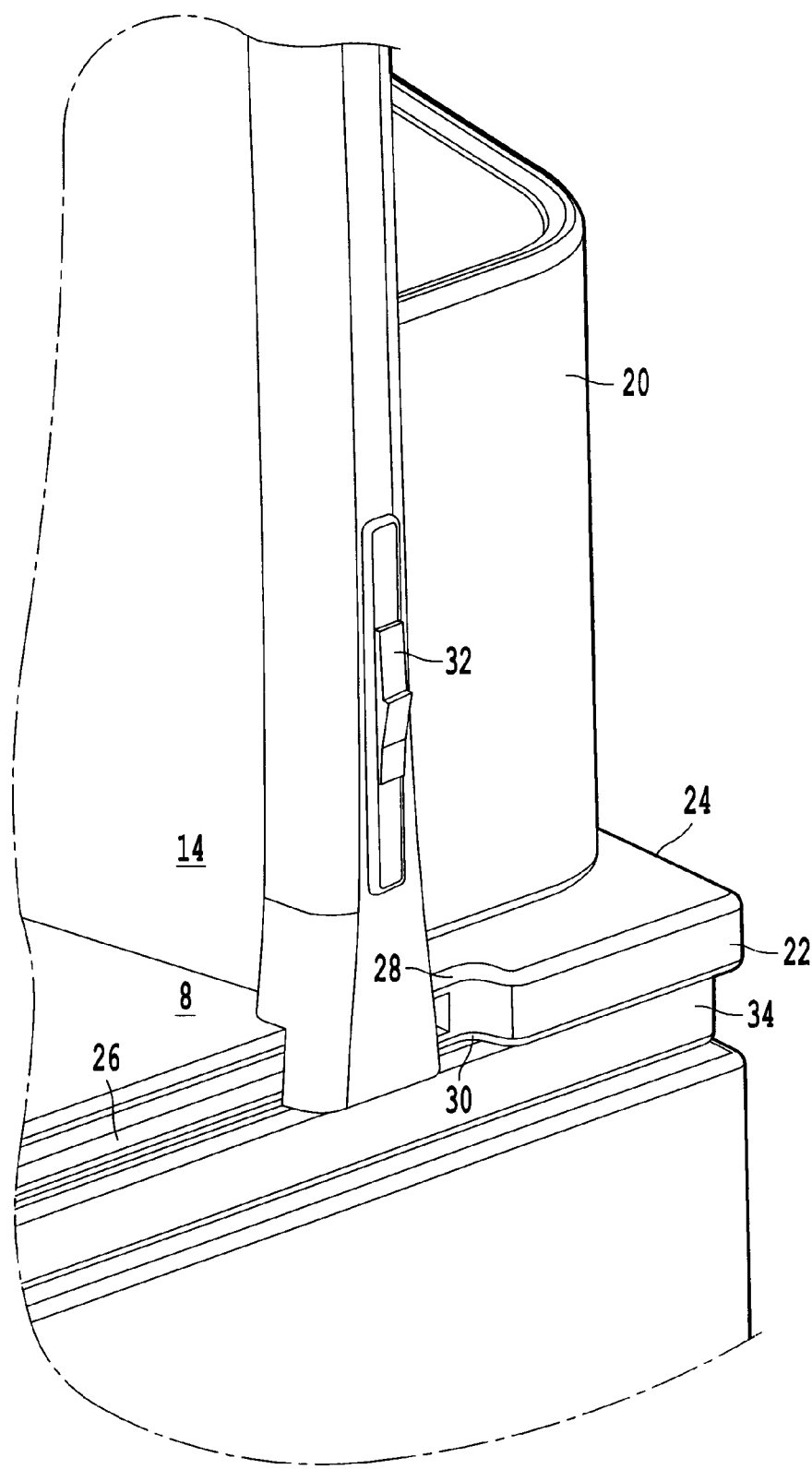
FIG. 10 is another detail view in perspective on an enlarged scale, of a portion of the unit of the preceding Figures.

FIGS. 9 and 10 illustrate how the movable partition 14 can slide in relation to the tray 8. The latter comprises two longitudinal edges 22 and two transverse edges 24. In the thickness of the tray 8, each longitudinal edge 22 is equipped with a longitudinal groove 26 in which a finger (not visible on the drawings) integral with the movable partition 14 comes to slide. In this way a guidance is achieved in the lower position of the movable partition 14.

As can be observed on FIGS. 9 and 10, the groove 26 does not extend over the entire length of the corresponding longitudinal edge 22 but each time stops before the end of this longitudinal edge 22. The groove 26 also is implemented at the bottom of an indentation 28. In this way there is implemented at each end of each longitudinal edge 22 a stop 30 limiting the course of the movable partition 14 and defining the extreme positions shown on FIGS. 1, 3, 4, 5, 7 and 8.

Figure 11:
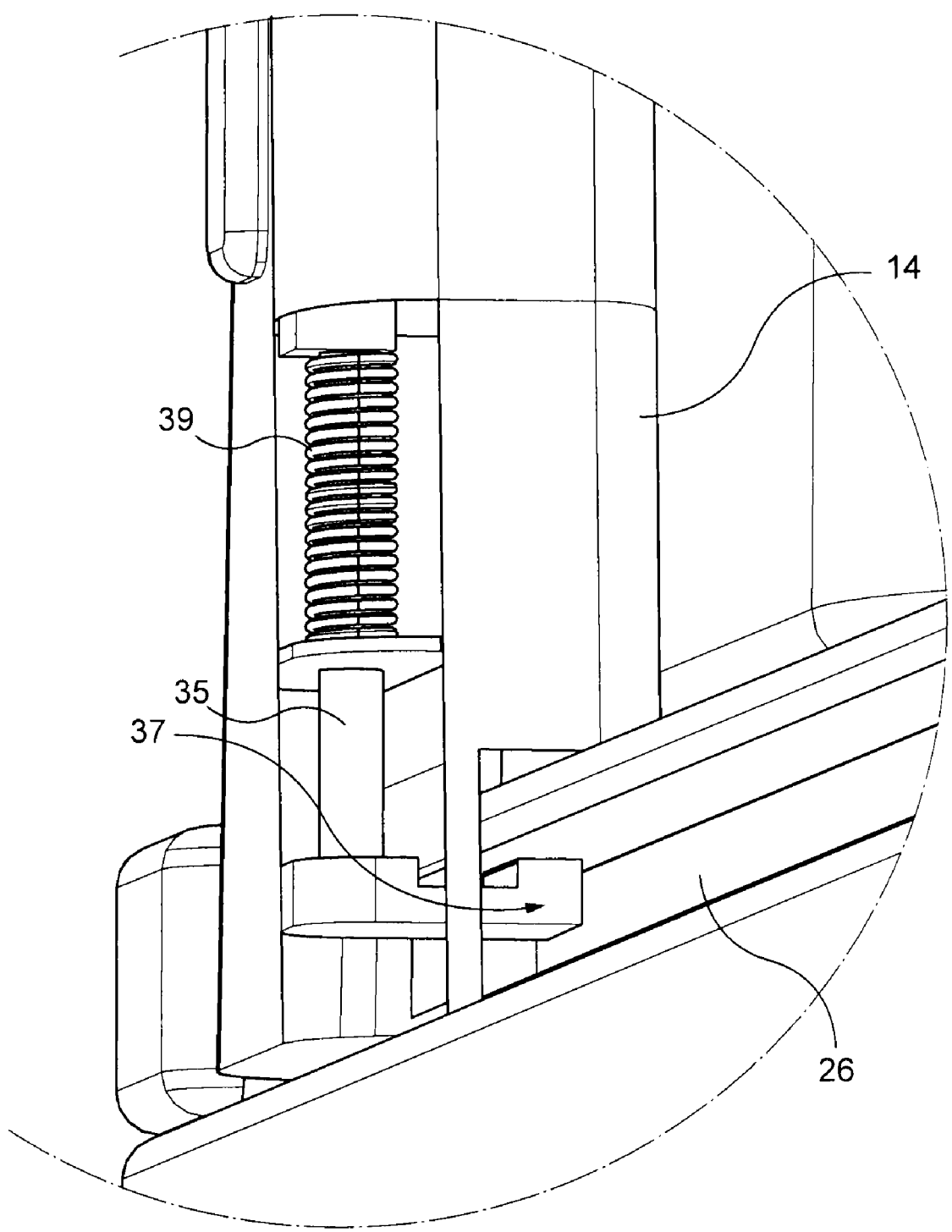
FIG. 11 is a perspective view in even greater detail than FIG. 10 and seen from another angle showing locking means that are concealed by a hood in FIG. 10.

The presence of a latch 32 on a vertical edge of the movable partition 14 also is observed on FIGS. 9 and 10. This latch 32 controls, for example, a locking finger cooperating with a housing for receiving the corresponding finger. This solution makes it possible to stop the movable partition 14 in predetermined positions. As a variant, the latch 32 can control, for example, a brake block which then, for example, comes to rest in the groove 26. It then is possible to lock the position of the movable partition 14 continuously in all its intermediate positions. This embodiment variant is shown on FIG. 11. In comparison with FIG. 10, FIG. 11 is a detail view seen from another angle and an ornamental hood concealing the locking mechanism has been removed. On this FIG. 11, there appears a shaft 35 the upper end of which is in direct contact with the latch 32. The lower end of the shaft 35 bears a block 37 that extends into the groove 26. A spring 39 acts on the shank 35 and the block 37 to prestress them upward and in this way to come to bring the block 37 against an inside surface of the groove 26. The latch 32, when it is activated downward, makes it possible to act on the brake block 37 and in that way release the movable partition 14. As soon as the latch 32 is released, the spring 39 acts to return the block 37 to its high position in which the movable partition 14 then is locked.

Guidance at the upper portion of the movable partition 14 is ensured by guide means cooperating with complementary means arranged, for example, at the ceiling. It is proposed here that an upper edge of the movable partition 14 be equipped with two guide fingers 33 that are intended to slide in longitudinal grooves implemented in the ceiling.

Figure 4:
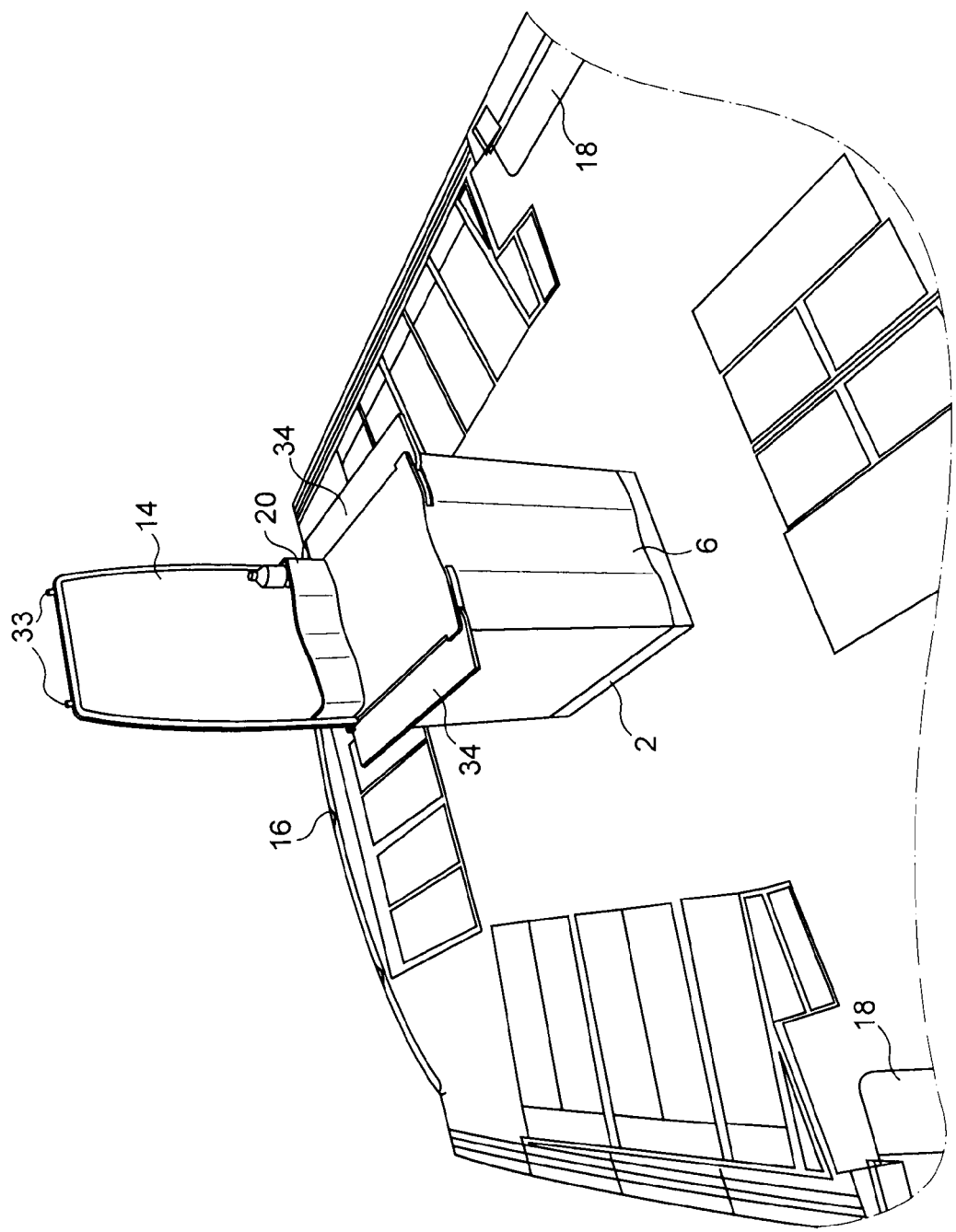
FIG. 4 shows the unit of FIG. 1 according to the same perspective in a fourth configuration.
Figure 8:
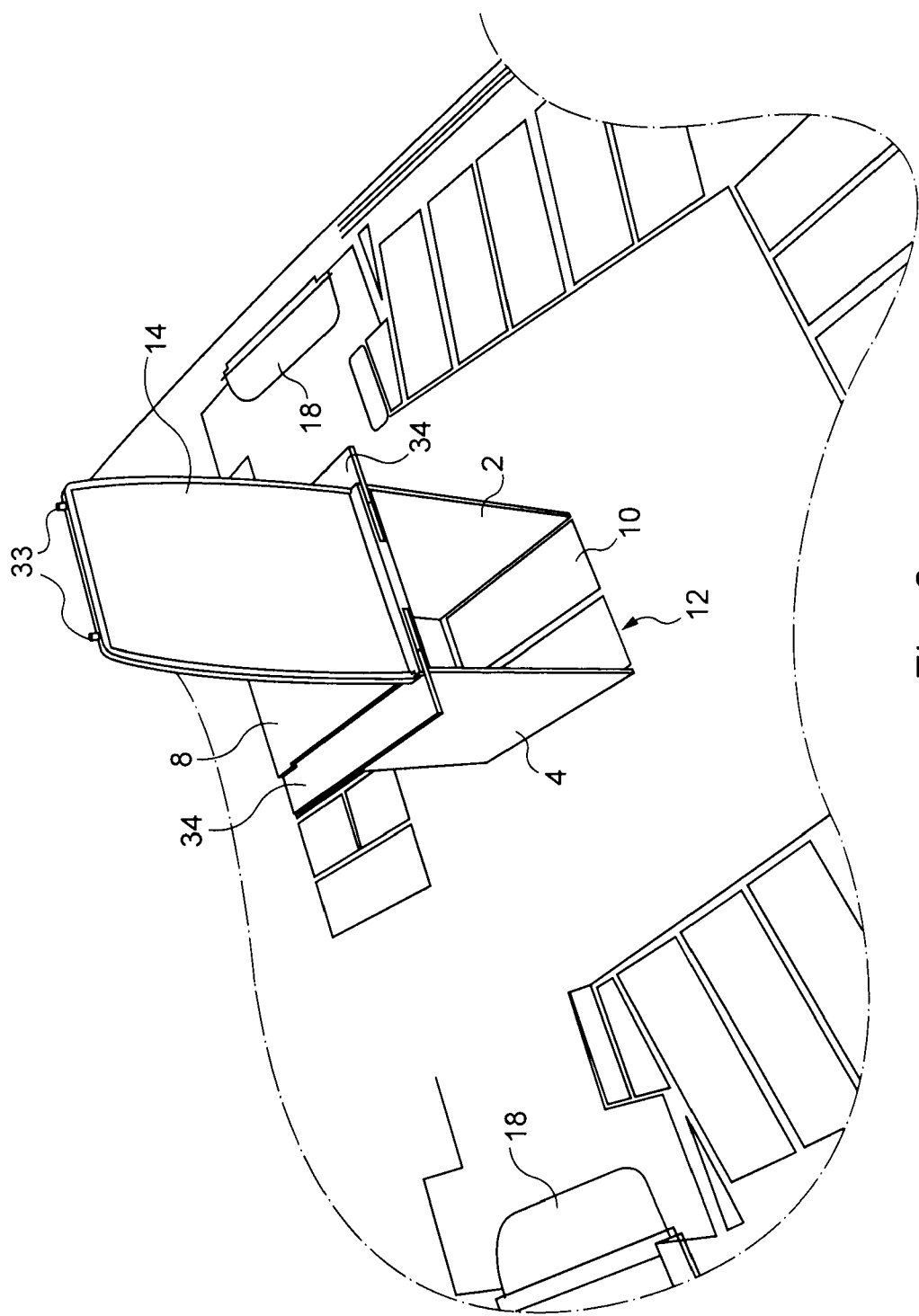

The presence of shelves 34 is observed on FIGS. 4 and 8. They are intended to enlarge the surface of the bar table when the movable partition 14 is, for example, in its extreme position moved back toward the end of the aircraft.

Each shelf 34 can be moved between a retracted position underneath the tray 8 and an opened-out position in which it forms a surface coming to project beyond the unit, along the longitudinal edges 22 of the tray 8.

The shelves 34 are in a horizontal plane and may be moved by translation along a horizontal transverse direction (the movable partition 14 moves by longitudinal horizontal translation). During this movement, the shelves 34 are guided by the tray 8 and the side walls 2 and 4.

Figure 12:
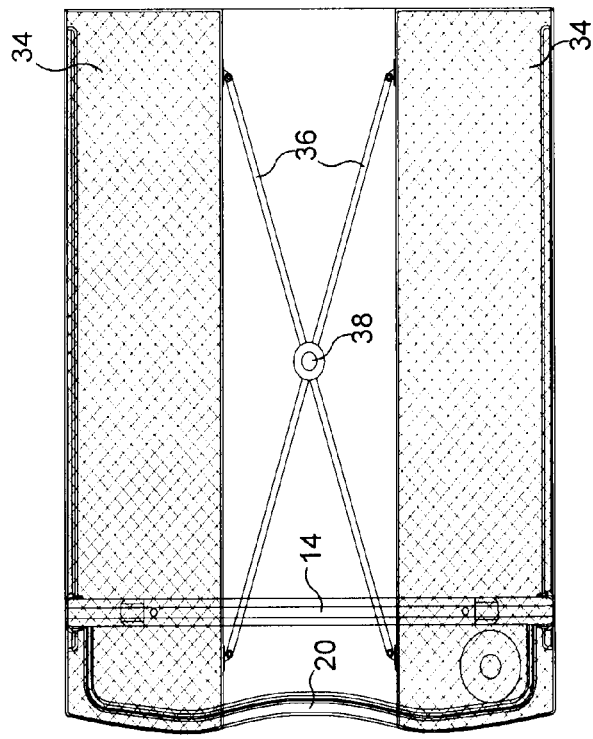
FIG. 12 is a schematic view from above of two shelves of the unit in retracted position.

FIGS. 11 and 12 show a mechanism making it possible to have the shelves 34 slide underneath the tray 8. The two shelves 34 shown here are connected by connecting rods 36 arranged crosswise and pivoting around a fixed point 38 embodied, for example, by a stud fastened underneath the tray 8. In this way, in pulling on one shelf 34 on one side of the unit, the other shelf 34 comes out of the other side of the unit. Likewise, when the shelves 34 are retracted, it suffices to act on one in order to control the retraction of the other.

Figure 13:
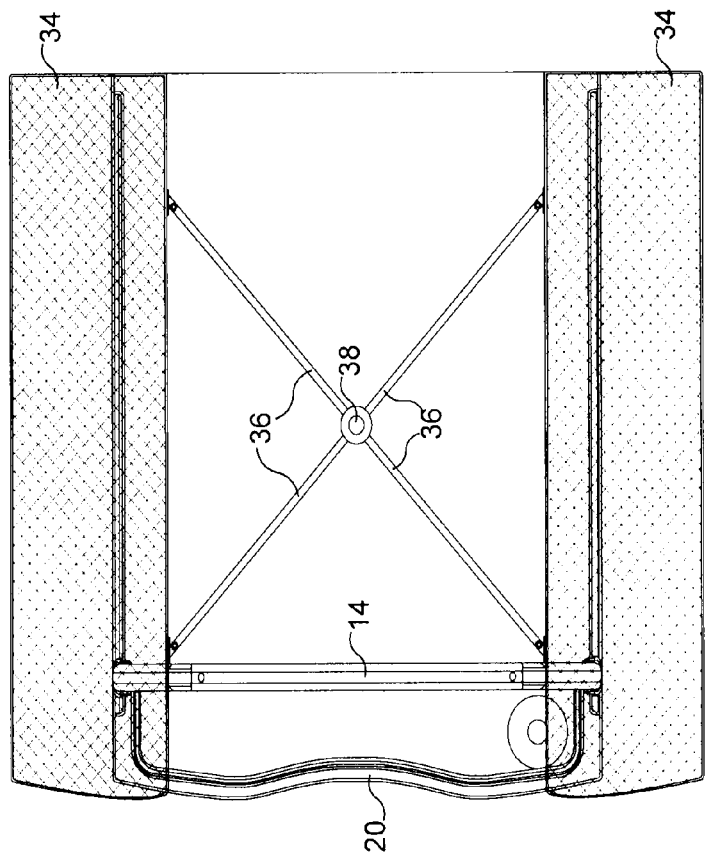
FIG. 13 is a view corresponding to FIG. 11, the shelves being in opened-out position.

FIGS. 13 and 14 show an embodiment variant bringing in four gas dampers 40. Each gas damper 40 is connected on the one hand to an inner edge of a shelf 34 and on the other hand to a support 42 in the form of a rail (in the embodiment shown) fastened underneath the tray 8. In this embodiment, it may be provided to act on the shelves 34 independently of one another or else to implement an X-shaped pantograph, then making it possible to subjugate the movement of one shelf 34 to that of the other.

As emerges from the above description, the unit according to the invention makes it possible to adjust the space in an aircraft. This unit advantageously is positioned at the rear of an aircraft but placing such a unit at a kitchen (or galley) situated in the cabin of the aircraft, at another location, may be contemplated.

The unit allows the storage of several trolleys while also being either a work space for the flight personnel, or a convivial space for the passengers, or at once a work space and a convivial space. The movable partition makes it possible to achieve a separation which, possibly finished off with curtains, allows the flight personnel to go about their business apart from the passengers who are very close by and who are relaxing.

This invention is not limited to the embodiments described above by way of non-limitative examples and to the variants indicated. It also relates to embodiment variants within the capacity of the individual skilled in the art in the context of the claims below.

The invention claimed is:

1. A storage unit for aircraft trolleys, comprising:
 a housing accommodating at least one aircraft trolley and including a horizontal tray arranged on top of the housing, and
 a movable partition extending in a plane perpendicular to the tray and above the tray so that at least a part of the movable partition extends up to a ceiling of an aircraft, and the partition is movable in translation from one edge of the tray to an opposite edge.

2. The storage unit according to claim 1, wherein the tray is rectangular, and includes two longitudinal edges and two transverse edges, and in that the movable partition extends parallel to the transverse edges and from one longitudinal edge to the opposite longitudinal edge.

3. The storage unit according to claim 2, wherein the longitudinal edges are each equipped with a guide cooperating with a complementary guide with which the movable partition is equipped.

4. The storage unit according to claim 3, wherein each longitudinal edge of the tray includes a groove implemented in the thickness of the tray, and the movable partition includes a guide finger corresponding to each of the two grooves and that slides in the corresponding groove.

5. The storage unit according to claim 4, wherein each groove stops before the end of the longitudinal edge of the corresponding tray, thus forming a natural stop for the movable partition.

6. The storage unit according to claim 1, wherein the movable partition includes a second guide on an edge opposite the tray.

7. The storage unit according to claim 6, wherein the movable partition includes, on the edge opposite the tray, at least two guide pins intended to slide in a groove implemented in the ceiling.

8. The storage unit according to claim 1, wherein the movable partition includes a lock making it possible to maintain the movable partition in a given position in relation to the tray.

9. The storage unit according to claim 1, further comprising:
at least one shelf arranged underneath the tray parallel thereto and movable between a fully retracted position underneath the tray and an opened-out position in which the shelf juts out over the tray, forming a projection.

10. The storage unit according to claim 9, wherein the shelf moves in translation along a direction parallel to the tray and perpendicular to the direction of movement of the movable partition.

11. The storage unit according to claim 1, further comprising:
two shelves arranged underneath the tray parallel thereto and movable between a fully retracted position underneath the tray and an opened-out position in which the two shelves jut out over the tray, forming a projection, and the two shelves extend from two opposite edges of the tray in their opened-out positions.

12. The storage unit according to claim 11, wherein the passage from the retracted position to the opened-out position of a shelf controls the passage from the retracted position to the opened-out position of the other shelf, and vice versa.

13. An aircraft, comprising the storage unit according to claim 1.

14. The aircraft according to claim 13, wherein the storage unit is arranged in a rear portion of the aircraft, behind a last door of the aircraft, and the unit is centered in relation to the width of the aircraft.

15. The storage unit according to claim 1, wherein the movable partition includes a rack that holds equipment.

16. The storage unit according to claim 1, wherein the movable partition includes a ventilation space between the movable partition and the ceiling.

* * * * *